United States Patent [19]

Okuyama et al.

[11] Patent Number: 5,956,225
[45] Date of Patent: *Sep. 21, 1999

[54] ACTIVATED CARBON, PROCESS FOR THE PREPARATION THEREOF AND ELECTRIC DOUBLE LAYER-TYPE CAPACITOR ELECTRODE

[75] Inventors: Kohei Okuyama; Kazushi Matsuura; Yoshitaka Takeda, all of Yokohama; Yoshio Yoshino, Kitakyushu, all of Japan

[73] Assignee: Mitsubishi Chemical Corporation, Japan

[*] Notice: This patent is subject to a terminal disclaimer.

[21] Appl. No.: 08/966,567

[22] Filed: Nov. 10, 1997

Related U.S. Application Data

[63] Continuation of application No. 08/544,809, Oct. 18, 1995, abandoned.

[30] Foreign Application Priority Data

Oct. 18, 1994 [JP] Japan .................................. 6-252061

[51] Int. Cl.$^6$ ............................. H01G 9/00; H01G 4/008
[52] U.S. Cl. ......................... 361/502; 361/305; 29/25.03
[58] Field of Search ..................................... 361/303–305, 361/306.1, 502–504, 311–314, 327–330; 29/25.03, 25.41, 25.42

[56] References Cited

U.S. PATENT DOCUMENTS 5,143,889   9/1992   Takahiro et al. ........................ 502/427

FOREIGN PATENT DOCUMENTS 0 514 545 A1   11/1992   European Pat. Off. ........ C01B 31/12
4-70770   4/1992   Japan .

OTHER PUBLICATIONS

National Technical Report, vol. 26, No. 2, Liquid Electrolyte Electric Double–Layer Capacitor "Gold Capacitor" Apr., 1980, pp. 220–230.

*Primary Examiner*—Leo P. Picard
*Assistant Examiner*—Phuong T. Vu
*Attorney, Agent, or Firm*—Nixon & Vanderhye

[57] ABSTRACT

An activated carbon has a specific surface area of pores with a pore diameter of not less than 20 Å in the pore distribution determined from the nitrogen adsorption isotherm of not less than 1,000 m$^2$/g, and the ratio of the specific surface area of the pores with a pore diameter of not less than 20 Å to the specific surface area of the whole pores of not less than 0.45.

11 Claims, No Drawings

ACTIVATED CARBON, PROCESS FOR THE PREPARATION THEREOF AND ELECTRIC DOUBLE LAYER-TYPE CAPACITOR ELECTRODE

This is a rule 62 file wrapper continuation of application Ser. No. 08/544,809, filed Oct. 18, 1995, now abandoned.

BACKGROUND OF THE INVENTION

The present invention relates to an activated carbon, a process for the preparation thereof, and an electric double layer-type capacitor electrode. More particularly, the present invention relates to an activated carbon having specific properties and utility, specifically the activated carbon suited for purification of service water, treatment of waste water, refining of foods, and use as an electrode material for capacitors, a process for producing such activated carbon, and an electrode for electric double layer-type capacitors.

Request is rising in the industries for activated carbon having higher utility and functional potentiality, but available activated carbons for the said uses are still unsatisfactory in their properties, and can not meet the request.

Attentions have been focused on electric double layer-type capacitor for use as back-up or auxiliary power source. Particularly, an electric double layer-type capacitor using activated carbon or porous carbon as polarizing electrode has an excellent performance and the demand of the electric double layer-type capacitor is said rising sharply with the progress in the field of electronics. Recently, efforts are being made not only for the utilization of the said capacitor for miniaturized parts as conventional memory back-up power source but also for the development of the large-capacity products such as those used for auxiliary power source for motors.

The principle of electric double layer-type capacitor has been known for long, but it is only recently that this electric double layer-type capacitor has been put to practical use.

It has been known that the electrostatic capacitance of electric double layer-type capacitor is subject to change depending principally on the surface area of the polarizing electrode having an electric double-layer formed thereon, the electric double-layer capacity per unit area and the electrode resistance, but its relation with the size of the ions in the electrolyte for forming the electric double layer is of particular importance.

Specifically, in an organic solvent-type capacitor utilizing ammonium ions, phosphonium ions or the like, it is said that the specific surface area portion with a pore diameter of not less than 20 Å in the pore distribution determined from the nitrogen adsorption isotherm is associated with electrostatic capacitance of the said capacitor. It is also considered that in the aqueous solution-type capacitor using an aqueous sulfuric acid solution as solvent, the specific surface area portion of the pores with a pore diameter of not less than 20 Å contributes to electrostatic capacitance under a condition of high current density and low temperature.

Hitherto, increase of specific surface area of activated carbon has been accomplished by an activation treatment with water-vapor or chemicals, but in activated carbon used for electric double layer-type capacitors, the utilization is made of the specific surface area of the pores with a pore diameter of not less than a specified value, so that activated carbon having an efficient pore distribution has been desired.

Thus, the key to the improvement in performance of activated carbon used for electric double layer-type capacitors is to efficiently produce an activated carbon with many pores of specific surface area with a pore diameter of not less than 20 Å in the pore distribution determined from the nitrogen adsorption isotherm.

Increase of the double layer capacitance has been attained by enlarging the specific surface area of activated carbon. Generally, however, an activated carbon with a large specific surface area has only a few mesopores with a pore diameter of not less than 20 Å, although it is rich with micropores. The mesopores can be increased by furthering activation, but this furthering of activation tends to decrease the whole specific surface area. Accordingly, there has so far been available no activated carbon which has realized the efficient utilization of specific surface area, in which the specific surface area of the mesopore region required for a large-capacitance capacitor is sufficiently large while the micropore region which little contributes to capacitor performance is reduced to a minimum. Generally, activated carbon with a large specific surface area can be obtained by activating a carbonaceous material such as coal, coconut shell, sawdust, etc., by a chemical means, and the obtained activated carbon has a specific surface area of the whole pores of not less than 3000 m$^2$/g. Among these activated carbons, there are activated carbons in which the specific surface area of the pores with a pore diameter of not less than 20 Å is about 1400 m$^2$/g, but since there also exist the micropore portions which little contribute to capacitor performance in use as activated carbon for capacitor, their performance in terms of capacitance was not satisfactory.

Although activated carbon with a large specific surface area can be obtained by a conventional activation method such as water-vapor activation or chemical activation of a carbonaceous material such as coal, the obtainable specific surface area of pores with a pore diameter of not less than 20 Å which is called mesopore region in the pore distribution determined from the nitrogen adsorption isotherm, is up to about 1000 m$^2$/g even if the activation degree is controlled. Further, the ratio of the specific surface area the pores with a pore diameter of not less than 20 Å to the specific surface area with the whole pore diameter was very low.

The pore distribution inclines to the micropore side by repeating the activation treatment, but repeated activation poses an economical problem. The specific surface area of the pores with a pore diameter of not less than 20 Å can be increased temporarily, but the ratio of the specific surface area of the pores with a pore diameter of not less than 20 Å to the specific surface area of the whole pore diameter is still low and satisfactory activated carbon can not be obtained.

In view of the above, there is yet found no activated carbon which can be effectively applied to large-capacitance capacitors, and it is considered necessary to design and prepare the pore distribution with a new concept.

As described above, in making activated carbon suited for large-capacitance capacitors, it has been impossible with the conventional concepts to increase the specific surface area by furthering activation to an excessive degree and to promote formation of useful mesopores.

As a result of the present inventors' earnest studies on a method for controlling the pore distribution, for obtaining an activated carbon which has made best use of surface area, in which the specific surface area of the mesopore region with a pore diameter of not less than 20 Å in the pore distribution determined from the nitrogen adsorption isotherm necessary, for large-capacitance capacitors is sufficiently large while the micropore region with low potency of contribution to capacitor performance is minimized, it has been found that by (1) carrying out a water-vapor activation of a carbonaceous material and subjecting the thus obtained carbonaceous product wherein the ratio of the specific surface area of pores with a pore diameter of not less than 20 Å to the specific surface area of whole pores is not less than 0.30, to an alkali activation-treatment, or (2) carbonizing a carbonaceous material, subjecting the carbonized carbonaceous material to an oxidation treatment and then further subjecting the oxidized product to alkali activation, the thus obtained activated carbon has the desired pore distribution which has never been obtainable with the prior arts, wherein the specific surface area with a pore diameter of not less than 20 Å in the pore distribution determined from the nitrogen adsorption isotherm is not less than 1000 m$^2$/g and the ratio of the specific surface area of pores with a pore diameter of not less than 20 Å in the pore distribution determined from the nitrogen adsorption isotherm to the specific surface area of whole pores is not less than 0.45. On the basis of this finding, the present invention has been attained.

SUMMARY OF THE INVENTION

The object of the present invention is to provide an activated carbon which can efficiently utilize the surface area by enlarging the specific surface area of the mesopore region necessary for large-capacitance capacitors while minimizing the micropore region which little contributes to capacitor performance.

To accomplish the aim, in the first aspect of the present invention, there is provided an activated carbon having a specific surface area of pores with a pore diameter of not less than 20 Å in the pore distribution determined from the nitrogen adsorption isotherm of not less than 1000 m$^2$/g, and the ratio of the specific surface area of the pores with a pore diameter of not less than 20 Å to the specific surface area of whole pores of not less than 0.45.

In the second aspect of the present invention, there is provided a process for producing activated carbon having a specific surface area of pores with a pore diameter of not less than 20 Å in the pore distribution determined from the nitrogen adsorption isotherm of not less than 1000 m$^2$/g, and the ratio of the specific surface area of the pores with a pore diameter of not less than 20 Å to the specific surface area of whole pores of not less than 0.45, which process comprises carrying out water-vapor activation of a carbonaceous material to obtain a carbonaceous product, in which the ratio of the specific surface area of pores with a pore diameter of not less than 20 Å to the specific surface area of the whole pores is not less than 0.30, and subjecting this carbonaceous product to alkali activation.

In a third aspect of the present invention, there is provided a process for producing activated carbon having a specific surface area of pores with a pore diameter of not less than 20 Å in the pore distribution determined from the nitrogen adsorption isotherm of not less than 1000 m$^2$/g, and the ratio of the specific surface area of the pores with a pore diameter of not less than 20 Å to the specific surface area of whole pores of not less than 0.45, which process comprises carbonizing a carbonaceous material, subjecting the carbonized carbonaceous material to an oxidation treatment, and then further subjecting obtained carbonaceous product to alkali activation.

In a fourth aspect of the present invention, there is provided an electric double layer-type capacitor comprising at least part of the electrode is composed of activated carbon having a specific surface area of pores with a pore diameter of not less than 20 Å in the pore distribution determined from the nitrogen adsorption isotherm of not less than 1000 m$^2$/g, preferably 1000 to 2500 m$^2$/g, and the ratio of the specific surface area of the pores with a pore diameter of not less than 20 Å to the specific surface area of whole pores of not less than 0.45.

DETAILED DESCRIPTION OF THE INVENTION

The activated carbon which meets the specified property requirements of the present invention can be obtained by alkali-activating a carbonaceous product obtained by subjecting a carbonaceous material to water-vapor activation, in which the ratio of the specific surface area the pores with a pore diameter of not less than 20 Å to the specific surface area with the whole pores is not less than 0.30, or by subjecting the carbonized carbonaceous material, after carbonization of the carbonaceous material, to an oxidation treatment and then further alkali-activating the obtained product.

The carbonaceous material used for initial water-vapor activation in the present invention is not specifically defined and practically any of the carbonaceous materials capable of forming pores on a water-vapor activation treatment can be used. Examples of such carbonaceous materials include coal, coconut shell, sawdust, resin, coal coke, coal tar, petroleum pitch, carbon fiber, carbon black and the like. At least one of these carbonaceous materials is used. Preferably coal, coconut shell, sawdust or resin which has been carbonized at a temperature of not less than 300° C. is used. The shape of the carbonaceous material is not specified, but usually the material is used in granular or powdery form.

For water-vapor activation, there can be used conventional carbon activation methods, in which the carbonaceous material is activated in the presence of water-vapor at a temperature of not less than 900 C°, preferably 950 to 1050 C°. This water-vapor activation reduces the resistance of the carbonaceous material, and the material still remains low in the resistance after further activation with an alkaline metal hydroxide. Improvement of electrostatic performance of the produced capacitor is considered attributable to this fact.

For obtaining the activated carbon of the present invention, it is preferable that in the pore distribution determined from the nitrogen adsorption isotherm after water-vapor activation treatment, the ratio of the specific surface area of the pores with a pore diameter of not less than 20 Å to the specific surface area of the whole pores is not less than 0.30.

In the present invention, after water-vapor activation, the carbonaceous material is further activated with an alkaline material. As activator for this alkali activation, there can be used hydroxides of alkaline metals such as KOH and NaOH, and hydroxides of alkaline earth metals such as Ba(OH)$_2$. Of these activators, KOH and NaOH are preferred.

The conditions for alkali activation are variable depending on the activator used for water-vapor activation but KOH and NaOH are preferable. In case, for instance, KOH is used as activator, alkali activation is carried out at a temperature in the range of 400 to 1,000 C°, preferably 550 to 800 C°. The contact time can also be suitably opted in accordance with the heating rate and working temperature. For example, when alkali activation is carried out at 550 to 800° C., the contact time is not more than 3 hours, preferably 10 minutes to one hour.

The alkaline activator is usually used in the form of an aqueous solution at a concentration of usually 10 to 90%, preferably 40 to 50%. The activator may be used in the form as it is, without preparing the aqueous solution thereof. An alkaline activator is used in an amount of 1 to 25 times, preferably 2 to 6 times the weight of the activator used for water-vapor activation.

In another method for obtaining the objective activated carbon according to the present invention, a carbonaceous material is subjected to a carbonization treatment, an oxidation treatment and then alkali activation treatment. More specifically, a carbonaceous material such as coal, coconut shell, sawdust, resin, carbon fiber, carbon black or the like is carbonized at a temperature of not less than 300 C°, preferably 500 to 700 C°, and the carbonized material is subjected to an oxidation treatment. This oxidation treatment may be accomplished by water-vapor activation, but preferably it comprises a heat treatment in an oxygen atmosphere such as air, preferably an atmosphere of an oxygen-containing gas with an oxygen concentration of 2 to 50%, preferably 5 to 15%, at a temperature of 150 to 500° C., or a wet oxidation treatment carried out using a usually 1 to 90%, preferably 30 to 70% aqueous solution of aqua regia, sulfuric acid, nitric acid or the like, so as to afford oxygen to the carbonized material to become a whole oxygen concentration of 1 to 30 wt %, preferably 10 to 20 wt % based on the oxidized material. The oxidization operation may be conducted after water-vapor activation described above. Thus, it is possible to obtain activated carbon of the present invention by carbonizing a carbonaceous material, then subjecting the carbonized material to an oxidation treatment in the manner described above, and then further subjecting the thus oxidized material to alkali activation in the same way as described above.

The activated carbon obtained in the manner described above has the specific surface area the pores with a pore diameter of not less than 20 Å in the pore distribution determined from the nitrogen adsorption isotherm of not less than 1000 $m^2/g$, preferably 1000 to 2500 $m^2/g$, and the ratio of the specific surface area of the pores with a pore diameter of not less than 20 Å to the specific surface area of the whole pores of not less than 0.45, preferably not less than 0.6. The average particle diameter of the activated carbon according to the present invention is in a range of 0.6 to 200 $\mu$m, preferably 1 to 30 $\mu$m.

The activated carbon of the present invention can be used a wide field of use as mentioned above. For example, it can be used, either in the form as it is or in combination with other kinds of activated carbon, for purification of service water, treatment of waste water, refining of foods, etc.

When the activated carbon is molded into a capacitor or other articles, the commonly known methods can be applied. For instance, a material known as binder, such as polyethylene fluoride resin, phenol resin, polyvinyl alcohol or cellulose is added in an amount of 1 to 15 wt % to the activated carbon and mixed well, and the resultant mixture is placed in a mold and is press-molded. If necessary, heat may be applied during press-molding.

When molding electrodes, electroconductive carbon blacks or other electroconductive material may be added in an amount of 5 to 20 wt % to the activated carbon of the present invention to reduce electrode resistance. Addition of the said material reduces internal resistance of the polarizing electrodes to allow effective utilization of the volume of the electrode.

According to the present invention, as described above, there is provided an electric double layer-type capacitor having a larger electrostatic capacity than possible with the conventional capacitors. Consequently, the use of the activated carbon of the present invention can be expanded to the field where a large discharge current is required, such as auxiliary power source of motors. Thus, the value of the present invention in its industrial utilization is very high.

EXAMPLES

The present invention is described in more detail below by showing the examples. It should be understood, however, that the present invention is not limited to these examples but can as well be embodied in other forms without departing from the scope and spirit of the invention.

Example 1

240 g of activated carbon powder having a specific surface area of 1,085 $m^2/g$ obtained by subjecting carbonized bituminous coal to water-vapor activation at 1,000° C., was immersed in a 50% concentration-KOH aqueous solution having 1,320 g of potassium hydroxide dissolved therein. The resulting slurry was placed in a vertical furnace, heated to 650° C. under a nitrogen atmosphere, retained in this state for 60 minutes and then cooled to room temperature. After repeating water washing seven times, the slurry was dried at 115° C. in a dryer to obtain activated carbon, and it was pulverized to a particle size not more than 200 $\mu$m (average particle diameter: 25 $\mu$m). The specific surface area of the whole in the obtained activated carbon as determined from its nitrogen adsorption was 1,755 $m^2/g$, and the specific surface area of the pores with a pore diameter of not less than 20 Å was 1,310 $m^2/g$. The ratio of the specific surface area of the pores with a pore diameter not less than 20 Å to the specific surface area of the whole pores was not less than 0.30 (ratio: 0.746).

To 1 g of the said activated carbon, 0.02 g of polytetrafluoroethylene powder (manufactured by Dikin Co., Ltd.) was added and mixed well, and the resultant mixture was press-molded by a hydraulic press (manufactured by Nippon Bunko CO., LTD.) to obtain a disc-like electrode having a diameter of 20 mm and a thickness of 1.5 mm. A polyethylene-made separator (manufactured by Mitsubishi Chemical Co., Ltd.) was placed between two sheets of electrode made in the manner described above, and the assembly was sandwiched between two sheets of platinum plate used for current collector and then further held by two sheets of 5 mm thick-Teflon plates having four bolt holes to securely contact of the current collector, pellets and separator. The thus obtained capacitor electrode was dipped in a 30 wt % sulfuric acid in a beaker to remove air bubbles, adhering to the electrode, thereby obtaining an electric double layer-type capacitor. This capacitor was subjected to 10 times of repetition of approximately 860 mA constant current charge and discharge cycle test at a temperature below −20° C. using an electric charging and discharging device (manufactured by Hokuto Denko CO., LTD.) and an X-T recorder (manufactured by Chino Seisakusho CO., LTD.) to measure electric capacity. The mean value of the electric quantity determined from the discharge curve in the usual way was represented as the electric quantity of the produced capacitor. The electric quantity measured under the above conditions is shown in Table 1.

Comparative Example 1

The same procedure as in Example 1 was carried out except that 240 g of the pulverized version of carbonized bituminous coal was immersed in an aqueous solution having 480 g of potassium hydroxide dissolved therein.

The specific surface area of the whole pores of the obtained activated carbon determined from the nitrogen adsorption was 1875 m²/g, and the specific surface area of the pores with a pore diameter of not less than 20 Å in the pore distribution determined from the nitrogen adsorption isotherm was 105 m²/g.

The electric quantity of the obtained activated carbon is shown in Table 1.

Example 2

The same procedure as in Example 1 was carried out except that the carbonized bituminous coal was subjected to an oxidation treatment with a gas of 10% oxygen concentration at 400° C. to increase the whole oxygen concentration from 6% to 18%, and that 240 g of the pulverized product of the obtained carbonaceous material was immersed in a 50% concentration-KOH aqueous solution having 1200 g of potassium hydroxide dissolved therein.

The specific surface area of the whole pores of the obtained activated carbon (average particle diameter: 30 μm) as determined from its nitrogen adsorption was 3035 m²/g, and the specific surface area of the pores with a pore diameter of not less than 20 Å determined from the nitrogen adsorption isotherm was 1810 m²/g. The electric quantity of this activated carbon is shown in Table 1.

Comparative Example 2

The same procedure as in Example 1 was carried out except that 480 g of the pulverized product of the carbonized bituminous coal was immersed in a 50% concentration-KOH aqueous solution having 2,640 g of potassium hydroxide dissolved therein, and that the time of retention of the slurry at 650° C. was 0 minute.

The specific surface area of the whole pores of the obtained activated carbon determined from the nitrogen adsorption was 2997 m²/g, and the specific surface area of the pores with a pore diameter of not less than 20 Å in the pore distribution determined from the nitrogen adsorption isotherm was 773 m²/g. The electric quantity of this activated carbon is shown in Table 1.

TABLE 1

|  | Specific surface area of whole pores (SBET) [m²/g] | Specific surface area of pores with pore diameter greater than 20 Å [m²/g] | Electric quantity at −20° C. and 860 mA (C/cc) |
|---|---|---|---|
| Example 1 | 1,755 | 1310 | 9.5 |
| Comp. Example 1 | 1,875 | 105 | 4.4 |
| Example 2 | 3,035 | 1810 | 13.0 |
| Comp. Example 2 | 2,997 | 773 | 8.2 |

What is claimed is:

1. Activated carbon having a specific surface area of pores with a pore diameter greater than 20Å in pore distribution of not less than 1,000 m²/g determined from nitrogen adsorption isotherm and a ratio of specific surface area of those pores with a pore diameter greater than 20 Å to the specific surface area of all of the pores of at least 0.45.

2. Activated carbon according to claim 1 in which the pores have an average particle diameter of 0.6 to 200 μm.

3. Activated carbon according to claim 1 in which the ratio of the specific surface area of those pores with a pore diameter greater than 20 Å in pore distribution to the specific surface area of all of the pores is at least 0.55.

4. A process for producing activated carbon which process comprises the successive steps of:

(a) water-vapor activating a carbonaceous material to obtain a carbonaceous product, in which the ratio of specific surface area of those pores with a pore diameter greater than 20 Å to the specific surface area of all of the pores is at least 0.30, and thereafter (b) subjecting carbonaceous product of step (a) to alkali activation to produce activated carbon having a specific surface area of pores with a pore diameter greater than 20Å in pore distribution of not less than 1,000 m2/g determined from nitrogen adsorption isotherm and a ratio of specific surface area of those pores with a pore diameter greater than 20 Å to the specific surface area of all of the pores of at least 0.45.

5. The process according to claim 4, wherein step (a) is carried out in the presence of water-vapor at a temperature of at least 900° C.

6. The process according to claim 4, wherein the alkali activator used in step (b) is a hydroxide of an alkaline metal or a hydroxide of an alkaline earth metal.

7. The process according to claim 4, wherein alkali activation is carried out at a temperature of 400 to 1000° C. for a period of not more than 3 hours.

8. A process for producing activated carbon, which process comprises the successive steps of:

(a) carbonizing a carbonaceous material, (b) subjecting the carbonized carbonaceous material produced in step (a) to oxidation, and then (c) further subjecting the carbonaceous product obtained in step (b) to alkali activation to produce activated carbon having a specific surface area of pores with a pore diameter greater than 20 Å in pore distribution of not less than 1,000 m2/g determined from nitrogen adsorption isotherm and a ratio of specific surface area of those pores with a pore diameter greater than 20 Å to the specific surface area of all of the pores of at least 0.45.

9. The process according to claim 8, wherein the carbonization of step (a) is carried out at a temperature of at least 300° C., and the oxidation treatment of step (b) is carried out in an oxygen-containing gas with an oxygen concentration of 2 to 50% at a temperature of 150 to 500° C., or in an oxygen-containing solution having an oxygen concentration of 1 to 90%.

10. The process according to claim 8, wherein the carbonaceous material is coal.

11. An electric double layer-type capacitor having an electrode comprising activated carbon having a specific surface area of pores with a pore diameter greater than 20 Å in pore distribution of not less than 1,000 m²/g determined from nitrogen adsorption isotherm and a ratio of specific surface area of those pores with a pore diameter greater than 20 Å to the specific surface area of all of the pores of at least 0.45.

* * * * *